United States Patent
Reichmuth et al.

(12)

(10) Patent No.: US 10,717,077 B2
(45) Date of Patent: Jul. 21, 2020

(54) PIPETTING DEVICE AND METHOD FOR OPERATING A PIPETTING DEVICE

(71) Applicant: EPPENDORF AG, Hamburg (DE)

(72) Inventors: Burkhardt Reichmuth, Hamburg (DE); Herbert Belgardt, Hamburg (DE); Steffen Hofmann, Hamburg (DE)

(*) Notice: Subject to any disclaimer, the term of this patent is extended or adjusted under 35 U.S.C. 154(b) by 339 days.

(21) Appl. No.: 15/532,922

(22) PCT Filed: Dec. 3, 2015

(86) PCT No.: PCT/EP2015/002447
§ 371 (c)(1),
(2) Date: Jun. 2, 2017

(87) PCT Pub. No.: WO2016/087046
PCT Pub. Date: Jun. 9, 2016

(65) Prior Publication Data
US 2017/0341072 A1    Nov. 30, 2017

(30) Foreign Application Priority Data
Dec. 4, 2014   (DE) .................. 10 2014 017 971

(51) Int. Cl.
*B01L 3/02* (2006.01)
*G01F 11/00* (2006.01)
*G01F 11/02* (2006.01)

(52) U.S. Cl.
CPC ........... *B01L 3/0227* (2013.01); *B01L 3/0237* (2013.01); *G01F 11/029* (2013.01);
(Continued)

(58) Field of Classification Search
None
See application file for complete search history.

(56) References Cited

U.S. PATENT DOCUMENTS 2,966,175 A * 12/1960 Hyde ................... B01L 3/0206
141/27
3,027,048 A *  3/1962 Rapisarda ............. B67D 7/227
222/35
(Continued)

FOREIGN PATENT DOCUMENTS

EP    2045607 A2    4/2009
GB    1487289 A  *  9/1977 ............. G01N 11/08

*Primary Examiner* — Jill A Warden
*Assistant Examiner* — Brittany I Fisher
(74) *Attorney, Agent, or Firm* — Todd A. Lorenz

(57) ABSTRACT

The invention relates to a pipetting device, more particularly a pipette or repeater pipette, for pipetting fluid laboratory samples, comprising: an electric control apparatus, by means of which a pipetting process is electrically controllable, a movable part, by means of the movement of which the fluid sample is pipettable, an electrically actuatable motor apparatus, by means of which the movement of the movable part is driveable depending on at least one first speed value defining the speed of the movable part, a measuring apparatus, by means of which at least one measured value which is influenced by the drag caused when pipetting the fluid sample is measurable, wherein the electric control apparatus is configured for the purposes of the at least one first speed value being fixable by the electric control apparatus, depending on at least one measured value. The invention furthermore relates to a method for operating the pipetting device.

10 Claims, 7 Drawing Sheets

(52) U.S. Cl.
CPC ... *B01L 2200/143* (2013.01); *B01L 2200/146* (2013.01); *B01L 2300/0627* (2013.01)

(56) References Cited

U.S. PATENT DOCUMENTS

| | | | |
|---|---|---|---|
| 3,389,596 A * | 6/1968 | Lion | G01N 11/10 73/54.32 |
| 4,345,483 A | 8/1982 | Paletta et al. | |
| 4,369,665 A | 1/1983 | Citrin | |
| 4,586,546 A * | 5/1986 | Mezei | G01N 35/1011 141/2 |
| 5,672,155 A | 9/1997 | Riley et al. | |
| 6,393,898 B1 * | 5/2002 | Hajduk | G01N 11/06 73/54.05 |
| 6,551,557 B1 * | 4/2003 | Rose | B01J 19/0046 422/502 |
| 6,575,019 B1 * | 6/2003 | Larson | G01N 11/04 73/54.04 |
| 2002/0005075 A1 * | 1/2002 | Kriz | B01L 3/0224 73/864.18 |
| 2007/0277627 A1 | 12/2007 | Telimaa et al. | |
| 2011/0160666 A1 * | 6/2011 | Hanson | A61M 5/14248 604/151 |
| 2012/0104040 A1 | 5/2012 | Curtis et al. | |
| 2012/0211517 A1 | 8/2012 | Schmid | |
| 2012/0259282 A1 * | 10/2012 | Alderete, Jr. | A61M 5/14244 604/131 |
| 2013/0288382 A1 | 10/2013 | Andres et al. | |
| 2014/0308750 A1 | 10/2014 | Reichmuth et al. | |

\* cited by examiner

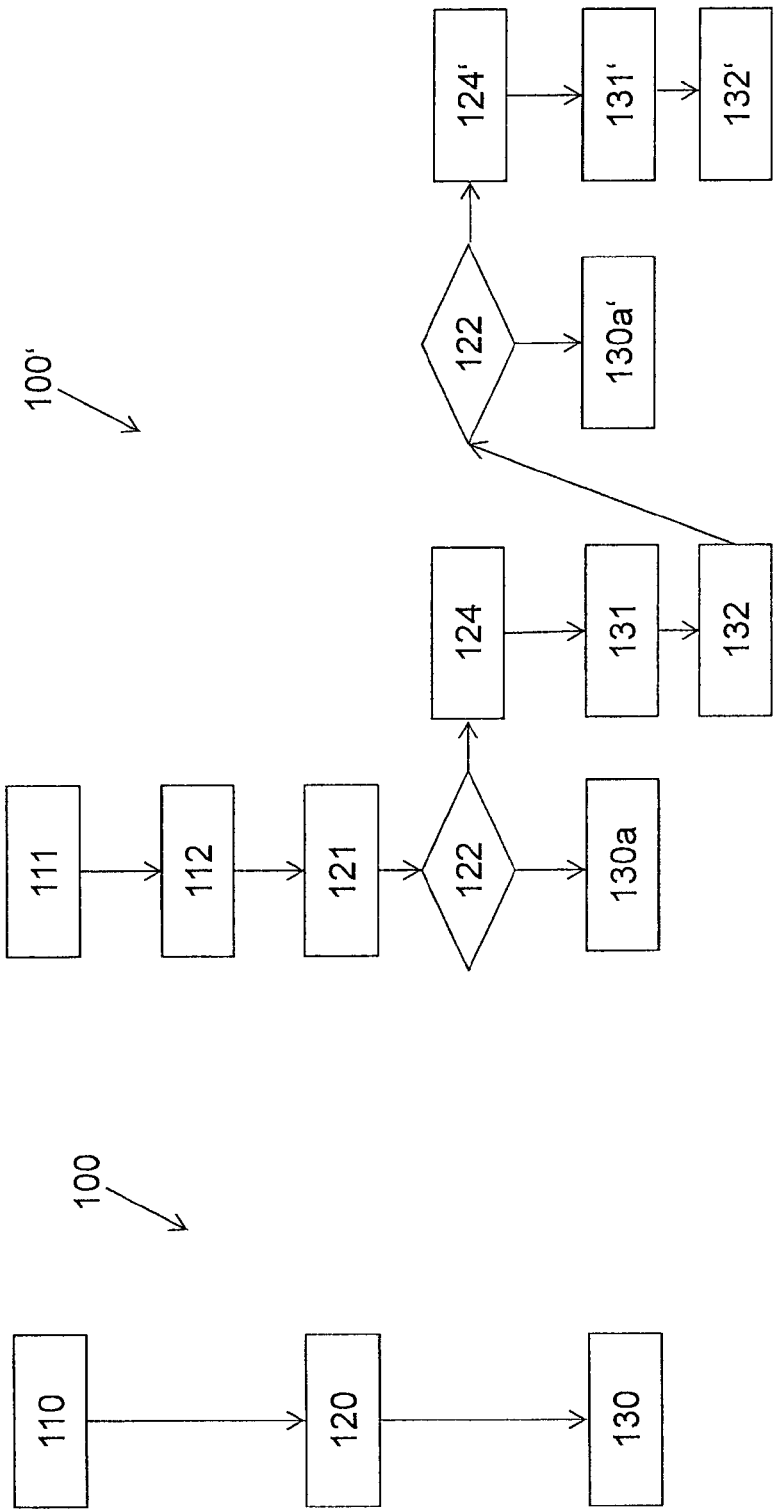

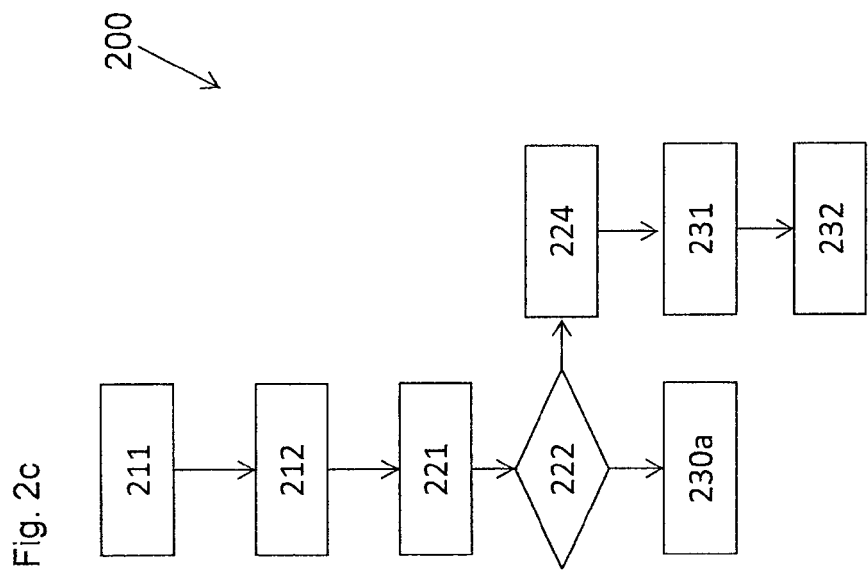

PIPETTING DEVICE AND METHOD FOR OPERATING A PIPETTING DEVICE

The invention relates to an electric pipetting device and a method for operating an electronic pipetting device.

Such pipetting devices are usually used in medical, biological, biochemical, chemical and other laboratories. In the laboratory, they serve to transport and transfer fluid samples with small volumes, in particular to meter the samples precisely. In pipetting devices, e.g. liquid samples are sucked up by means of negative pressure in pipette containers, e.g. pipette tips, stored there and re-emitted therefrom at the target location. An electronic pipetting device uses at least one electronic operating parameter, which at least influences or controls the operation of the pipetting device. Electronic pipetting devices are also denoted in an abbreviated manner by the term "pipetting devices" below.

Pipetting devices include e.g. hand-held pipettes and repeater pipettes, with the latter also being denoted as dispensers. A pipette is understood to mean an instrument, in which a sample to be pipetted can be suctioned into a pipetting container, in particular a pipetting tip, which is detachably connected to the pipette by means of a movement apparatus, which is assigned to the instrument and which, in particular, can have a plunger. In an air-cushion pipette, the plunger is assigned to the instrument and an air cushion which is under negative pressure when receiving the sample into the pipette container is situated between the sample to be pipetted and the plunger end, with said negative pressure being used to suction the sample into the pipetting container. A dispenser is understood to mean an instrument in which a volume to be pipetted can be suctioned into a pipetting container, in particular a dispenser tip configured according to the syringe principle, connected to the dispenser by means of a movement apparatus, which can, in particular, have a plunger, wherein the movement apparatus is at least partly assigned to the pipetting container, for example by virtue of the plunger being arranged in the pipetting container. In the case of the dispenser, the plunger end is situated very closely to the sample to be pipetted or in contact with the latter, which is why the dispenser is also referred to as a direct displacement pipette. Pipette tips or dispenser tips preferably consist of plastic and can also be discarded after use as a single-use article or be replaced by a new pipette tip or dispenser tip. Pipette tips dispenser tips are made available in various sizes for metering in various volume ranges.

In a pipetting device, the amount of sample dispensed by a single actuation can correspond to the amount of sample suctioned into the instrument. However, provision can also be made for a received amount of sample, which corresponds to a plurality of amounts to be dispensed, to be re-dispensed step-by-step. Moreover, a distinction is made between single-channel pipetting devices and multichannel pipetting devices, wherein single-channel pipetting devices only contain a single dispensing/receiving channel and multichannel pipetting devices contain multiple dispensing/receiving channels which, in particular, permit parallel dispensing or receiving of a plurality of samples.

An example of a hand-held electronic pipette is the Eppendorf Xplorer® by Eppendorf AG, Germany, Hamburg. Examples for hand-held, electronic dispensers are the Multipette Stream® and Multipette Xstream® by Eppendorf AG, Germany, Hamburg. These devices are operated electrically, like the pipetting device in accordance with the present invention, by virtue of the pipetting movable part, in particular the plunger, being moved by an electric motor apparatus of the pipetting device.

Electric pipetting devices offer numerous advantages over non-electronic pipetting devices since a multiplicity of functions can be implemented in a simple fashion. In particular, carrying out specific, program-controlled pipetting processes can be simplified in electronic pipetting devices by virtue of these being automated or semi-automated. Typical operating parameters for controlling such pipetting processes by means of corresponding pipetting programs relate to the volume when suctioning-in or dispensing liquid, the sequence and repetitions thereof and optional time parameters in the distribution of these processes over time. In particular, such operating parameters are predetermined by the user or by the instrument such that the pipetting processes dependent on these operating parameters are set in an inflexible and often hardly efficient manner.

It is an object of the present invention to provide an improved electronic pipetting device and an improved method for operating an electronic pipetting device.

In particular, the invention achieves this object by means of a pipetting device according to claim 1 and the method according to claim 11. In particular, preferred refinements are the subject matter of the dependent claims.

The pipetting device according to the invention, more particularly pipette or repeater pipette, for pipetting fluid laboratory samples comprises: an electric control apparatus, by means of which a pipetting process is electrically controllable, a movable part, by means of the movement of which the fluid sample is pipettable and, in particular, pipetted, an electrically controllable motor apparatus, by means of which the movement of the movable part is driveable and, in particular, driven depending on at least one first speed value defining the speed of the movable part, a measuring apparatus, by means of which at least one measured value which is influenced by the drag caused when pipetting the fluid sample is measurable or measured, wherein the electric control apparatus is configured for the purposes of the at least one first speed value being fixable and, in particular, fixed by the electric control apparatus, depending on the at least one measured value. Preferably, the electric control apparatus is configured for the purposes of the at least one first speed value, in particular at least in an operating state of the pipetting device, being fixed depending on the at least one measured value by way of the electric control apparatus.

The pipetting device according to the invention offers the advantage that the speed of the part electrically driven when pipetting, in particular when receiving liquid and/or dispensing liquid, in particular of the plunger, can be adapted automatically. As a result, the operation of the pipetting device is more flexible when receiving liquid and/or dispensing liquid. In particular, such a pipetting device is not restricted to carry out the pipetting process depending on a single speed value selected by the user or predetermined by the pipetting device. Rather, the speed of the pipetting process can be adapted to the drag which occurs when pipetting the fluid sample, when receiving liquid and/or when dispensing liquid. The first speed value is, in particular, proportional to the pipetting speed. This is understood to mean the sample amount of the fluid sample transported through an opening cross section per unit time. The opening cross section can be the opening cross section of a transport container, in particular a pipetting tip or a dispenser tip, connected to the pipetting device.

The invention is based on the experience that the pipetting speed cannot be arbitrarily high due to the occurring drag.

First of all, the motor power of the pipetting device is restricted and overloading should be avoided. Secondly, excessive speed will lead to metering errors. By way of example, a metering error can occur if the air cushion between a plunger and the sample is increased during pipetting due to high viscosity of the sample. Furthermore, what was determined within the scope of the invention is that users often select the pipetting speed to be relatively small, resulting in a relatively long-duration pipetting process. Usually, known standard values are selected for the speed values or used by default by the pipetting device.

Firstly, the invention offers the possibility of embodying the pipetting device in such a way and adapting the at least one first speed value in such a way that a speed value pre-selected by the user or by the pipetting device is automatically reduced in order to avoid pipetting errors and/or that the preselected speed is maintained after a check. Secondly, the invention provides the option of embodying the pipetting device in such a way and adapting the speed value in such a way that the at least one first speed value is increased depending on the drag, as a result of which the duration of the pipetting processes is reduced and the productivity when using the pipetting device is increased.

The drag is known as a physical variable which denotes the force with which the fluid opposes the movement thereof. The drag is characterized by the pressure resistance and friction resistance. The drag force $F_w$ depends on the inflow velocity v, the density p and the dynamic viscosity q of the fluid and the geometric dimension L of the body onto which the flow is directed. Hence, in the case of the constant drag which, in particular, can be measured at the maximum admissible motor power, the speed of the fluid flow, and hence the speed of the movable part (plunger) which causes the fluid flow depends, in particular, on the viscosity of the fluid. Pipetting devices are used to pipette different fluid samples with different viscosities. The ranges of possible speed values suitable for pipetting depend on the viscosity of the respective sample. In these suitable ranges, the amount of sample moved by the movable part, in particular by the plunger, is proportional to the deflection of the plunger. In the case of an inhomogeneous fluid sample, the drag can moreover be characterized by variations in the viscosity distribution in the sample, in particular by the solids present in the fluid sample, such as flakes or filaments, or other particles, agglomerate or phase differences in the sample.

The measured value registered by the measuring apparatus is influenced by the drag caused when pipetting the fluid sample. The measured value can be different when receiving the liquid and dispensing liquid and can be determined separately, or else it can be equal. In particular, the measured value depends on the drag or it is a known relation or function depending on the drag. In particular, the relation can be a tabular assignment of speed values and measured values, known in advance, or else a mathematical function, by means of which unique assignments of the values can be calculated.

Since the drag depends on the viscosity of the sample, the measured value depends on the viscosity of the sample. In a preferred embodiment of the pipetting device, an electric operating parameter of the electric motor apparatus, in particular, is evaluated as an option for measuring the drag at least indirectly or for registering the measured value, wherein this operating parameter is, in particular, characteristic for the energy consumption or the physical variable of work carried out by the motor apparatus under predetermined operating conditions, in particular a predetermined speed value. In particular, it is possible to measure a measured value characterizing the energy consumption of the motor apparatus under predetermined operating conditions. Alternatively, this measured value can directly measure the force or a torque necessary to move the movable part during the measuring process. Preferably, the motor current of the electric motor apparatus, occurring here, is registered, particularly in the case of a predetermined speed value of the movable part. Furthermore, the at least one measured value can also be measured by virtue of an amount of fluid passing through an opening cross section per unit time being measured in the case of a pipetting device, which amount of fluid is moved during the pipetting process.

The measuring apparatus is preferably integrated into the electric motor apparatus. An electric motor apparatus is preferably configured to register an operating parameter of the motor apparatus and make it available such that this operating parameter can be read out by the electric control apparatus in particular. The operating parameter is preferably the motor current of the motor apparatus. The motor apparatus can comprise part of the electric control apparatus of the pipetting device. In particular, the control apparatus of the motor apparatus can comprise this measuring apparatus and/or it can be configured to set the at least one first speed value depending on the at least one measured value. In particular, the motor apparatus can operate in a program-controlled manner, can be configured in a software-controlled manner and/or can have a closed-loop control apparatus integrated into the control apparatus of the motor apparatus. The electric control apparatus is configured, in particular, to control the motor apparatus and/or it is configured, in particular, to control the motor apparatus in a closed-loop manner by way of a closed-loop control apparatus of the control apparatus, wherein the at least one measured value can, in particular, be a measured variable of this closed-loop control and the at least one speed value can be a manipulated variable of this closed-loop control. The closed-loop control apparatus is preferably configured as a proportional-differential controller (PD controller).

The measuring apparatus and/or the control apparatus is, in particular, configured for the purposes of measuring the at least one measured value, which is influenced by the drag caused when pipetting the fluid sample while the motor apparatus drives the movable part. This measurement preferably takes place without the movement of the movable part being interrupted by this measurement. As a result, the pipetting takes place, in particular, without interruption by the measurement, as a result of which the efficiency of the pipetting device is improved. In particular, the measuring apparatus and/or the control apparatus is configured for the purposes of setting the at least one first speed value depending on at least one measured value by way of the electric control apparatus, while the motor apparatus drives the movable part, preferably without the movement of the movable part being interrupted by setting the at least one first speed value.

An electric motor apparatus can have an electrically driven stepper motor. It is also possible for the motor apparatus to have a linear motor. Preferably, the electric motor apparatus has a DC motor which is preferably driven at a constant DC voltage which, in particular, lies between 4 V and 40 V, in particular at 15 V. The DC motor is preferably driven step-by-step. This can be brought about by virtue of it being driven by the, or an, electric control apparatus by way of a rectangular voltage, the duty factor of which in particular defines the step duration. In particular, the rectangular voltage can extend between 0 V and 15 V. A step can be defined by a period of the periodic rectangular voltage.

It is possible for the pipetting device to have a gearing apparatus which, in particular, is arranged between motor apparatus and movable part in order to transmit movement generated by the motor apparatus to the movable part, in particular the plunger, in particular to step up or step down a rotational speed. The electric motor apparatus can have a rotor. The rotor can rotate a spindle of the gearing apparatus which, in turn, can bring about the translational movement of a plunger of the pipetting device. The rotor, the spindle or the plunger can respectively be considered to be this movable part. In this manner, the speed of the rotor uniquely determines the speed of the plunger, and hence the speed of the pipetting process. The speed value can, in particular, be the speed of a part movable by translation, in particular of a plunger, or it can be a rotational speed, in particular of a part movable by rotation, e.g. the rotor or a spindle. The at least one speed value can, in particular, be proportional to a motor rotational speed, or it can be a motor rotational speed. The speed value can be proportional to the number of steps per unit time, particularly if the motor apparatus has an electric motor driven step-by-step.

The electric control apparatus can have electric circuits, in particular integrated circuits, and/or it can have a microprocessor and/or a CPU, data storage and/or program storage. The control apparatus can be configured to process program code. The program code can be configured to determine the at least one first speed value depending on the at least one measured value and it can, in particular, be configured to implement the preferred embodiments of this function of the pipetting device, which he described within the scope of the invention.

In particular, the electric control apparatus is configured to control a pipetting process in accordance with at least one, in particular in accordance with a plurality of, operating parameters, in particular to control it automatically or semi-automatically. An automatic control means that, for carrying out the pipetting process, substantially only a start signal is entered by the user by way of a user interface apparatus of the pipetting device and/or that, in particular, the receiving process of at least one fluid sample into at least one transport container connected to the pipetting device can be carried out or is carried out without a user input being required and/or that, in particular, the dispensing process of at least one fluid sample from at least one transport container connected to the pipetting device can be carried out or is carried out without a user input being required. In the case of a semi-automatic control, at least one further user entry is required to carry out the receiving or dispensing process in addition to the entry of a start signal, e.g. an entry with which the user confirms at least one operating parameter to be used after entering the start signal and before carrying out the pipetting process. Both controls—the automatic and semiautomatic control—of the pipetting process provide for the movement of the movable part to be carried out by the drive of the motor apparatus during the pipetting process.

The electric pipetting device can be configured to be operated in one operating mode or in a plurality of operating modes. One operating mode can provide for a set with one or more operating parameters of the pipetting device, which influence or control the one pipetting process of the pipetting device, to be automatically queried, set and/or applied. The decision as to what the value of an operating value should be is generally respectively made by the user when using the pipetting device and the operating parameter is set accordingly. At least one operating parameter of the set of operating parameters, in particular this at least one speed value of a speed parameter, is set by the electric control apparatus.

In accordance with a pipetting program, a pipetting process of a programmable pipetting device can typically provide for a specific amount of sample to be received in a pipetting container connected to the pipetting device from a start container and, in particular subsequently, to be emitted again, in particular emitted in a metered manner, to a target container. Depending on the application, the receiving and/or the dispensation of the sample(s) can follow specific orders, in particular sequences, of receiving and dispensing steps, can be carried out in the time-dependent manner and can be matched in time. A pipetting process can preferably be controlled by a set of operating parameters, by means of which the aforementioned processes can be influenced as desired.

Operating parameters for controlling a pipetting process preferably relate to setting the volume to be pipetted in the step of suctioning the sample into a pipetting container connected to the pipetting device or in the step of dispensing the sample from this pipetting container, optionally to the sequence and repetitions of the steps, and optionally to time parameters in the distribution of these processes in time, in particular also to the change of such processes in time, in particular the speed on the basis of the speed value and/or acceleration of the suctioning-in or dispensing of the sample. According to the invention, provision is made for the at least one speed value of a speed parameter to be set by the control apparatus.

The pipetting process is preferably uniquely set by the set of operating parameters. This set of operating parameters is preferably selected and/or entered at least in part, and preferably completely, by the user, in particular by way of the operating apparatus of the pipetting device. A control program for carrying out the desired pipetting process is preferably controlled by way of a set of operating parameters. The control program can respectively be configured in the form of electric circuits of the control apparatus and/or be configured by executable program code, which is suitable for controlling the control apparatus, which is preferably controllable by program code and preferably programmable.

The pipetting device is preferably configured to automatically check the parameter values entered by the user and to compare these with an allowed range of the respective operating parameter. If the parameter value entered by the user lies outside of the admissible range, the entry is preferably either not accepted or set to a default value which, for example, may be the minimum value or the maximum value or the last admissible value entered.

An operating state of the pipetting device denotes a ready state of the pipetting device, in which the operating parameters required for carrying out a pipetting process have a value such that the pipetting process can be carried out on the basis of these values.

Preferably, the electric control apparatus is configured to evaluate the at least one measured value automatically and to modify the at least one first speed value depending on the result of this evaluation, in particular in an automatic manner. It is possible for this function to be activatable or deactivatable by the user by virtue of the pipetting device offering corresponding input and/or selection possibilities. Thus, this function is activated, in particular, in at least one operating state of the pipetting device, while there can also be an operating state in which this function is deactivated, although it is present in the pipetting device.

The aforementioned automatic modification of the at least one speed value can provide for a speed value being increased or reduced. It preferably does not provide for the at least one first speed value to be set to zero such that the movable part would not move during the pipetting process. Nevertheless, provision is made in a preferred embodiment of the pipetting device for the evaluation of the at least one measured value resulting in the pipetting process needing to be aborted because the at least one speed value lies in an inadmissible range. This case should not be mistaken for the function according to the invention that the at least one speed value is set or modified by the control apparatus depending on the at least one measured value. By way of example, the pipetting process can be aborted if the measurement provides a measured value, in particular a value for the motor current, from a region in which an operation of the pipetting device can lead to the damage thereof. This abort condition is also referred to as an emergency shutdown.

An advantage emerging if the pipetting device is configured to reduce the speed value depending on the measured value is that, in particular, an emergency shutdown can be avoided. In particular, this can be achieved by virtue of the measurement being carried out within a first time interval of the pipetting process, e.g. within a first time interval of preferably 50 ms, preferably 30 ms, preferably 25 ms, particularly preferably 20 ms, preferably 15 ms, preferably 10 ms, in particular measured after a setpoint value for the first speed value is achieved, and the at least one first speed value being reduced where necessary, depending on the result of the measurement. The same measurement can be used to undertake an evaluation, on the basis of which the emergency shutdown is carried out. Alternatively, there can be a second measurement after another time interval, which, in particular, can directly adjoin this first time interval, in order to undertake this evaluation, on the basis of which the emergency shutdown is carried out. As a result, it is possible to reduce the speed value by the first measurement in order to optimize the pipetting process and to ensure by the same measurement or the second measurement that an emergency shutdown can be carried out in order to protect the pipetting device and optionally avoid the sample being wasted.

As an alternative or in addition to the measuring apparatus, the rotational speed of the electromotive drive and/or the speed of the movement of the movable part, in particular of the plunger of a pipette or the syringe plunger of a dispenser tip, can also be measured by means of a sensor. To this end, a plurality of sensors can accordingly also be provided.

Preferably, the control apparatus is configured to modify the at least one first speed value continuously, or in a step-by-step manner, depending on the at least one measured value. Preferably, a plurality of different constant speed levels of the at least one first speed value are provided. These speed levels can be selected depending on the type of transport container connected to the pipetting device during a pipetting process, in particular on the maximum volume of the type, and said speed levels can, in particular, be selected automatically or manually. By way of example, provision can be made in each case for N3 speed levels for each predeterminable type of transport container, where 5<=N3<=50, wherein the speed levels of the respective predeterminable transport containers are different from one another. In this way, it is possible to take account of the various flow conditions and resistance conditions which may occur, in particular as a function of the geometry of the transport container.

Preferably, the control apparatus changes the at least one first speed value step-by-step and, in particular, reduces the latter step-by-step if a higher speed level is respectively not achieved within a predetermined period of time or if a predeterminable current for operating the motor apparatus is exceeded for the respective speed value in each case. This predeterminable period of time can lie in the ms range and preferably lie between 10 and 50 ms, particularly preferably between 20 and 40 ms and particularly preferably at 25 ms.

Preferably, the control apparatus is configured to carry out the calculation of at least one first speed value or a speed profile from a plurality of these first speed values, preferably within a predetermined time interval which is preferably 1 ms, preferably 800 µs, preferably 500 µs and particularly preferably 300 µs. This is advantageous in that pipetting with a non-optimized first speed value only takes place within such a very short period of time before the speed value is adapted and the pipetting process proceeds optimally.

When calculating the speed profile from a plurality of these first speed values, the path of the movable part, in particular of the plunger of the pipetting device or of the plunger of a dispenser tip, already covered is preferably taken into account and included in the calculation. As a result, a high precision of the sample volume to be pipetted is achieved during the pipetting process.

Preferably, the electric control apparatus is configured for the purposes of the at least one first speed value in at least one operating state of the pipetting device being increased by the electric control apparatus, depending on at least one measured value.

Preferably, a pipetting process is characterized by at least one time value and the control apparatus is preferably configured to set the at least one first speed value depending on the at least one time value such that a pipetting process can be carried out taking into account the at least one measured value, in particular within a predetermined time interval. This takes place considering the at least one measured value, which, in particular, characterizes the drag. As a result, the pipetting process can be adapted or optimized in respect of the time value. In particular, the time value can be reduced and, in particular, the overall duration of a pipetting process can be minimized taking into account the at least one measured value. The control apparatus preferably has a clock.

Preferably, the electric control apparatus is configured for the purposes of setting the at least one speed value automatically depending on the at least one measured value in such a way that there is no departure from a predetermined tolerance range for the at least one measured value. As a result, it is possible, in particular, to regulate the at least one first speed value, which then serves as manipulated variable, depending on at least one measured value, which then serves as measured variable of the closed-loop control. Like the at least one reference value, the tolerance range can be predetermined and stored in a data storage of the pipetting device, or it can be storable there, in particular by way of the user or by way of storing carried out by machine.

Preferably, a pipetting process is characterized by at least one energy consumption value, in particular a current consumption value, of the pipetting device, more particularly of the motor apparatus, and the control apparatus is preferably configured to set the at least one first speed value depending on the at least one energy consumption value in such a way that a pipetting process is carried out, particularly at a predetermined, more particularly at a minimum, energy consumption value. Firstly, this can be used to observe the tolerated values for the drag, which has a direct influence on the energy consumption in order to enable a reliable and precise pipetting process.

Secondly, that is to say alternatively or additionally, this function can be used to optimize the energy consumption of the instrument, in particular to reduce or minimize the energy consumption within a predetermined tolerance range for the at least one first speed value. A set of operating parameters of the pipetting device, which uses a first speed value of a speed parameter set thus can characterize an energy-saving mode of the pipetting device (energy-saving function). In particular, this energy-saving function can be carried out dependent on the charge state of a battery device which is preferably provided in the pipetting device and which, in particular, serves for operating the motor apparatus. Thus, the at least one first speed value can be selected, in particular depending on the charge state of the battery device. It is possible that the energy-saving function is used automatically or switched off in at least one operating state which, in particular, can be activatable and deactivatable by the user, particularly if the charge state drops below or exceeds a certain threshold.

Preferably, the pipetting device has a user interface apparatus. The latter can comprise a touch-sensitive display, referred to as a touchscreen, and/or a display, and/or at least one operating knob, rocker, lever and/or rotary knob. The user interface apparatus can further comprise a loudspeaker, in particular to emit an acoustic signal depending on the measured at least one measured value, by means of which the user is informed or warned about, in particular, the measured value and/or a change in the at least one first speed value and/or the abort of the pipetting process.

Preferably, the control apparatus is configured to use at least one second speed value, in particular selected by the user, in order to set the at least one first speed value depending on the at least one second speed value. The at least one second speed value can characterize a tolerance range, within which the at least one first speed value, set automatically by the pipetting device, may lie. As a result, the user can influence the functionality of the pipetting device, which can thereby be used more flexibly.

Preferably, the pipetting device comprises a user interface apparatus, a clock and a storage apparatus for storing digital data, wherein the control apparatus preferably has a computer apparatus, in particular a CPU or a microprocessor, and is configured to:
  use at least one second speed value selected by the user in order to carry out a pipetting process using the at least one second speed value during a first time interval,
  determine at least one first measured value during the first time interval,
  carry out a comparison operation using the computer apparatus in order to compare the first measured value with a reference value stored in the storage apparatus.

This procedure is advantageous in that the second speed value selected by the user can be checked and, in particular, be used to reliably determine the first measured value as the first speed value is preferably kept constant during the measurement. The first time interval can be selected to be so short, preferably less than or equal to 50 ms, preferably less than or equal to 30 ms, preferably less than or equal to 20 ms, preferably less than or equal to 15 ms, preferably less than or equal to 10 ms, that, in any case, damage to the pipetting device as a result of a second speed value that is too high is avoided, in particular avoided during the overall service life of the pipetting device.

Preferably, the first measured value characterizes a first drag of the fluid laboratory sample moved during the first time interval and the reference value characterizes a maximum permissible drag of a fluid laboratory sample, wherein the control apparatus is configured, during a second time interval, in particular, following the first time interval, to carry out a comparison operation and, depending on the result, carry out at least one further operation, as follows:
  if the first measured value is less than the reference value:
    carry out the pipetting process using at least one first speed value, which is greater than the at least one second speed value, and, alternatively or additionally:
  if the first measured value is greater than the reference value: carry out the pipetting process using at least one first speed value, which is less than the at least one second speed value, and additionally or alternatively:
    abort the pipetting process ("emergency shutdown").

The at least one first speed value can be calculated by the pipetting device or it can be gathered from a table which assigns at least one first speed value to the measured value measured. This table or this calculation prescription is preferably stored or storable and predetermined or predeterminable in a storage apparatus for storing digital data of the pipetting device.

Preferably, the control apparatus is configured to measure a plurality N1 or a multiplicity N2 of measured values, where $2<=N1<=10$ and $N2>10$, in particular in a sequential or periodically repeating sequence, in particular with a time interval T of preferably $5\ ms<=T<=50\ ms$, and to undertake an evaluation of the speed values. A change in the at least one first speed value can then be brought about in such a way that the at least one first speed value is changed, in particular reduced or, alternatively, increased, depending on a plurality of, in particular successive, measured values. The evaluation can provide for the measured values to be compared to at least one reference value or to a plurality of reference values. It is possible for a difference between two measured values to be determined and, in particular, to be compared with a reference value for the difference. As a result, a non-continuous profile in the measured values can be identified and this discovery can be used to change the at least one first speed value in order once again to achieve a continuous profile of measured values. A non-continuous profile of measured values can, in particular, be an indication of a heterogeneous fluid sample.

Preferably, the control apparatus is configured to store the at least one first speed value, which is set to carry out a pipetting process depending on the at least one measured value, in a data storage of the pipetting device. Preferably, a data record which contains at least the first speed value v1 and the measured value M measured at this speed value is stored. In particular, the data record can contain a correlation, e.g. as a table, in which the pipetting device can, from a known parameter set for the first speed v1 and the measured value M, uniquely derive another data record for the first speed N1_a and the measured value M_a. The other data record can have the ideal values v1 and M, at which the pipetting process of a sample, which exhibits the measured value M at the first speed v1, is operated using the optimized values v1_a and M_a. "Optimized" can mean that a sample with a known drag, which is characterized by M, is pipetted with a safe speed v1_a, at which no metering errors occur. The value v1_a can also be selected in such a way that the pipetting process is completed as quickly as possible at an admissible speed. Such a data record can furthermore comprise further data in order to determine the parameters v1_a and M_a in a desired manner. By way of example, the further data can be those which characterize the drag, e.g. the information about the type of the transport container connected to the pipetting device, namely the dispenser tip or pipette tip. Furthermore, the value M or M_a can be related to the sample by virtue of a measured value established at a specific first speed value being linked to a sample type or sample material. The material can be communicated to the user by way of e.g. the display such that such a pipetting device has a material or sample identification function. Preferably, the pipetting device has such a data record which was established either by this pipetting device ("memory function") or in a different pipetting device, and in particular which was stored into the data storage by means of factory settings or subsequent loading processes.

The pipetting device is preferably configured as a metering device of a system for titrating liquids, as is described, in particular, in one of claims 1 to 30 of the European patent application number 06027038.6, published as EP 1 825 915 A2, by the applicant, or as described in a preferred embodiment of the system like in this patent application, the disclosure of which in this respect is incorporated in the present application by reference. In particular, such a pipetting device has a reader apparatus for reading the tag of the detachably connected pipetting containers, held by means of a further holding apparatus of the pipetting device, in particular of a syringe or tip. Such a pipetting container, in particular the syringe or tip, has at least one tag which, for example, contains information about the respective type and/or state of the pipetting container. By way of example, the information relates to the nominal volume and/or the type (e.g. form and/or dimensions) and/or the material and/or the purity and/or the manufacturer and/or the manufacture date and/or uses of the pipetting container that have taken place. The metering device has a reader apparatus configured to read the tag of the syringe or the tip when the latter is held at the metering device by means of the further holding apparatus. The control apparatus controls the movement of the movable part, in particular of the plunger, depending on the tag read by the reader apparatus.

As a result of this, it is possible to adapt the movement of the movable part, in particular of the plunger, to e.g. the type and/or state of the respectively used syringe or tip. By way of example, the speed and/or the acceleration and/or the displacement of the movable part (i.e. the distance covered by the movable part) can be matched to the respective pipetting container. The dispensed volume flows in particular can therefore be matched to the respective pipetting container. Thus, it is possible, for example, for the volume flows dispensed in the case of a specific dispensation step to correspond in the case of pipetting containers with different nominal volumes, which makes the titration with the syringes or tips which have different nominal volumes easier for the user. Furthermore, it is possible to dispense small, defined amounts of liquids (e.g. droplets) at the end of the titration, independently of the respectively used pipetting container. Dispensing small, defined amounts of liquid make it easier for the user to identify the endpoint. Errors due to reaction time of the user can be avoided. Therefore, the system makes reaching the endpoint of the titration easier for the user. Impairments when establishing the endpoint of the titration due to the use of different pipetting containers are dispensed with.

The tag can be configured in many different ways. In particular, various embodiments that are detectable by means of sensors or measured variable recorders are conceivable. The tag comprises e.g. a microchip and/or RFID, to which data is written and/or writable, which data can be read by the reader apparatus. In accordance with one embodiment, the tag is mechanically and/or optically scannable. By way of example, this relates to elevations and/or depressions in a surface of the pipetting container, which are scannable by mechanical and/or optical means. The specific arrangement of the elevations and/or depressions forms the tag of the respective syringe or tip. In accordance with a further embodiment, the reader apparatus is an apparatus for mechanical and/or optical scanning. The reader apparatus is suitable for scanning the mechanically and/or optically scannable tag. In particular, the tag and the reader apparatus can be configured like the scanning surfaces and scanning apparatus in accordance with EP 0 657 216 B1, the disclosure of which in this respect is incorporated into the present application by reference.

Preferably, the pipetting device and/or the control apparatus thereof is configured to set the at least one speed value defining the speed of the movable part depending on the information about the respective type and/or state of the pipetting container, which was established by means of the reader apparatus, preferably in such a way that, at this first speed value, a previously set threshold of the drag of the sample to be pipetted is not exceeded, or on the basis of a correlation stored in a data record. The pipetting device and/or the storage apparatus thereof preferably contains a data record which contains correlations between the information about the respective type and/or state of the pipetting container on the one hand and the at least one speed value respectively assigned thereto on the other hand. This data record can also be transmittable into the storage apparatus of the pipetting device by way of a communication apparatus of the pipetting device, wherein this transmission is preferably controllable as required by means of the control apparatus.

As a result of the known correlation between the information about the type and/or operating state of the pipetting container and the at least one speed value, the pipetting device is configured to set the at least one speed value, established by means of the reader apparatus, as the at least one first speed value, in particular before or after the measuring apparatus has measured the measured value which is influenced by the drag caused during the pipetting of the fluid sample, or without this measured value being measured. The speed value of the reader apparatus can be set as the at least one first speed value, which is then checked by means of the speed value of the measuring apparatus, in particular verified—wherein, preferably, the set speed value is not modified—or falsified—wherein, preferably, the set speed value is modified and set anew. If the type of the pipetting container is known, it is possible, in particular, to use an already adapted speed value at which safe and quick pipetting is possible. The further adjustment, e.g. the fine adjustment, of the first speed value can then take place using the knowledge about the measured value measured. The control apparatus is preferably configured to establish the at least one speed value dependent on the measured value and compare it with the at least one speed value which emerges dependent on the information about the respective type and/or state of the pipetting container, and it is preferably configured to set the at least one first speed value from the comparison of the two speed values. The ideal speed value can also be set without such a comparison.

It is preferable for a closed-loop control process to take place for establishing an ideal first speed value, in which the first speed value is regulated. In particular, this can take place as follows: in order to measure the at least one measured value, the movement of the movable part is preferably driven by means of the electrically controllable motor apparatus as a function of at least one speed value, which defines the speed of the movable part and which, for example, can be stored in a storage apparatus of the pipetting device and/or which can be adjustable by a user. Preferably, the at least one measured value is established while the movable part is driven. In particular, this can take place within a set time interval after the driving is started up. The measured value is preferably evaluated by the control apparatus, in particular by using a comparison operation carried out in the microprocessor and/or the CPU of the control apparatus, and the at least one first speed value is preferably set depending on the result of this evaluation. In the comparison operation, the setpoint value for the measured value is compared, in particular, to the measured actual value for the measured value by virtue of, in particular, the difference between actual value and setpoint value being formed. This difference is referred to as system deviation. This system deviation can be used when determining the at least one first speed value which, in particular, serves as manipulated variable of the closed-loop control. In particular, the control can preferably be a PD, ID or PID control. The setpoint value for the measured value can, in particular, be a maximum admissible motor current and/or can, in particular, be stored in a storage apparatus of the pipetting device.

It is possible and preferable for the measured value to be established anew after setting the at least one speed value by virtue of the movable part being driven using the previously set speed value and a measurement being carried out in the process, and, preferably, for the at least one first speed value being set anew after a further evaluation of the at least one first speed value measured in the process. This process can be repeated a number of times, in particular during a pipetting process, or it can, in particular, also be repeated at regular time intervals or regularly depending on a different parameter, e.g. the pipetted sample volume. As a result of these closed-loop control processes, the at least one first speed value can be set in an ideal manner. Preferably, the system deviation is used in the aforementioned evaluation in order to set—in particular again—the at least one first speed value. In particular, the system deviation is the difference between Preferably, the pipetting device is configured to resort to the already stored speed value if the profile, namely a stored data record containing the value pair consisting of at least one speed value and at least one measured value, is recognised. As a result of this, a faster adaptation of the pipetting device is possible, in particular by faster setting of the ideal first speed value. In particular, this can be implemented as follows:

Preferably, the pipetting device and/or the control apparatus is configured to compare the data record A, consisting of a) the at least one measured value M1, which was established depending on at least one first speed value W1, and b) this at least one speed value W1, with a data record B, which contains at least one second speed value W2 and at least one measured value M2 correlated with the second speed value. The second data record B can be stored in the storage apparatus of the pipetting device. In particular, M1 can be compared with M2 during this comparison, in particular by virtue of the data record B containing a table with correlated value pairs ($M2_i$, $W2_i$); if this comparison determines that $M1=M2_i$ applies, the value W1 is set by $W1=W2_i$. It is also possible that if this comparison determines that $W1=W2_i$ applies, the value M1 is set by $M1=M2_i$.

Preferably, the pipetting device and/or the control apparatus is configured in such a way that a data record, in particular the data record A and/or the data record B, can be interchanged between the pipetting device and an external data-processing instrument, e.g. a PC, and/or between the control apparatus and an external data-processing instrument, e.g. a PC, i.e., in particular, be transferred from the pipetting device to the external data-processing instrument and/or be transferred from the external data-processing instrument to the pipetting device. In particular, the pipetting device can be configured to enable such a data interchange in a wired or wireless manner.

Preferably, the pipetting device is configured to allow the user to manually enter a viscosity value, which is influenced by the drag caused when pipetting the fluid sample, in particular a value for the viscosity of the sample to be pipetted, which viscosity value is then, in particular, stored by the pipetting device and preferably evaluated. The control apparatus is preferably configured to select the at least one speed value assigned to the viscosity value from this manually entered viscosity value and preferably set said speed value to be the at least one first speed value. The use of the pipetting device becomes even more flexible by the option for manual entry.

Preferably, the pipetting device is configured according to one of the claims in the European patent application number 12001933.6 by the applicant, or according to a preferred embodiment described therein, the disclosure of which application in this respect is incorporated into the present application by reference. This pipetting device for carrying out an at least partly electrically controlled pipetting process on at least one fluid laboratory sample in accordance with at least one operating mode of the pipetting device comprises—an electric control apparatus for controlling the pipetting process, which is controllable by a set of operating parameters settable by the user, which pipetting process is assigned to an operating mode and respectively comprises at least one operating parameter, wherein the user, for the purposes of setting the operating parameter, selects the desired value of the operating parameter as parameter value and thus determines a set of parameter values with at least one parameter value, —at least one operating apparatus for setting the set of operating parameters by the user, —an electric storage apparatus for storing the at least one set of parameter values, wherein the electric control apparatus is configured to automatically store the at least one set of parameter values determined by the user as the at least one historic set of parameter values of this operating mode in the storage apparatus. Preferably, the at least one measured value which is influenced by the drag caused when pipetting the fluid sample is contained in this parameter set and/or the at least one first speed value is obtained, in particular, depending on the at least one measured value. This pipetting device offers the advantage that at least one set of parameter values in the operating history of the pipetting device which was already previously set by the user and, in particular, used, which set of parameter values in particular contains this at least one measured value and/or the at least one first speed value, need not be set again if the aforementioned history function of the pipetting device is active, in particular activated. In this manner, the user can save himself a number of editing processes at the pipetting device over the course of time; in particular, it is possible to use a set of parameter values, which, in particular, contains a respectively suitable at least one measured value and/or at least one first speed value, suitable for the sample to be pipetted from the knowledge of the user. The ideal speed value can thus be set even quicker or more efficiently.

The pipetting device according to the invention can be a single-channel pipette or a multichannel pipette. Furthermore, in particular, it can be a pipette or a repeater pipette (dispenser). The pipetting device is preferably configured for hand-held operation; that is to say, it is preferably operable by a user using one hand. However, it is also possible and preferable for the pipetting device to be configured as an automated laboratory machine which, in particular, is configured for robot-controlled transporting, metering and/or distributing of fluid samples. Automated laboratory machines of this type without the embodiment according to the invention were, in particular, offered at the priority date of the patent application under the trademark "epMotion" by Eppendorf AG, Hamburg, Germany.

Furthermore, the invention relates to a method for operating a pipetting device, in particular a pipetting device according to the invention, comprising the following steps:

a) measuring at least one measured value by means of a measuring apparatus of the pipetting device during a pipetting process, wherein the at least one measured value is influenced, in particular determined, by the drag caused when pipetting the fluid sample;

b) automatically setting at least one first speed value by means of an electric control apparatus of the pipetting device depending on the at least one measured value, wherein such a first speed value defines a speed of the movable part of the pipetting device, wherein the fluid sample is pipettable by the movement of the movable part;

c) electrically controlling the electric motor apparatus of the pipetting device using the at least one first speed value set in step b) which defines the speed of the movable part, by means of which the motor apparatus drives the movement of the movable part.

Features and preferred embodiments of the method according to the invention can be gathered from the description of the pipetting device according to the invention and the preferred embodiments thereof.

The invention furthermore relates to a program code for a software-controllable pipetting device, in particular a pipette or repeater pipette, comprising: an electric control apparatus, by means of which a pipetting process is electrically controllable, a movable part, by means of the movement of which the fluid sample is pipettable, an electrically actuatable motor apparatus, by means of which the movement of the movable part is driveable depending on at least one first speed value defining the speed of the movable part, and a measuring apparatus, by means of which at least one measured value which is influenced by the drag caused when pipetting the fluid sample is measurable, wherein, in particular, the electric control apparatus is initially not configured for the purposes of the at least one first speed value being fixable by the electric control apparatus, depending on the at least one measured value.

This software-controllable pipetting device becomes capable of carrying out the method according to the invention and, optionally, one of the preferred embodiments thereof, or capable of carrying out the step that the electric control apparatus is configured for the purposes of the at least one first speed value being fixable by the electric control apparatus, depending on at least one measured value, and optionally carrying out further steps, which were already mentioned above, by using the program code, in particular by loading the program code into a program code storage of this software-controlled pipetting device. Hence, the invention also relates to a program code for a software-controllable pipetting device which is converted or extended to a pipetting device according to the invention by using the program code according to the invention. In this manner, it is possible to retrofit electronic pipetting devices to have the properties according to the invention. In particular, the invention relates to a data medium, e.g. an optical data medium, e.g. a CD, a flash memory or a hard disk drive, which contains this program code according to the invention.

Further preferred embodiments of the pipetting device according to the invention and the method according to the invention emerge from the subsequent description of the exemplary embodiments in conjunction with the figures and the description thereof. The same components are substantially denoted by the same reference signs in the exemplary embodiments, unless something else is described or something else emerges from the context. In detail:

FIG. 1*a* shows a side view of a pipetting device according to the invention, configured as a repeater pipette, in accordance with a preferred embodiment, with a dispenser tip connected thereto.

FIG. 1*b* shows the dispenser tip from FIG. 1*a*.

FIG. 1*c* schematically shows the pipetting device of FIG. 1*a* with the dispenser tip from FIG. 1*a*.

FIG. 1*d* shows a perspective side view of a pipetting device according to the invention, which is configured as an electronic air-cushion pipette and has a pipetting tip connected to the connection cone thereof.

FIG. 2*a* shows a flowchart of the method according to the invention for operating a pipetting device in accordance with a preferred embodiment.

FIG. 2*b* shows a flowchart of the method according to the invention for operating a pipetting device in accordance with a preferred embodiment.

FIG. 2*c* shows a flowchart of the method according to the invention for operating a pipetting device in accordance with another preferred embodiment.

Figure 1C:
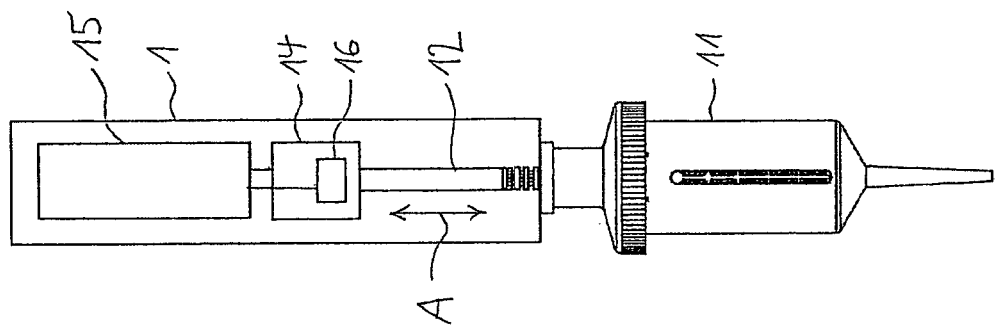
Figure 1B:
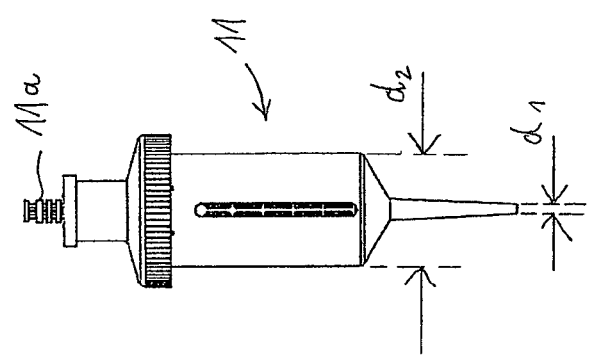
Figure 1A:
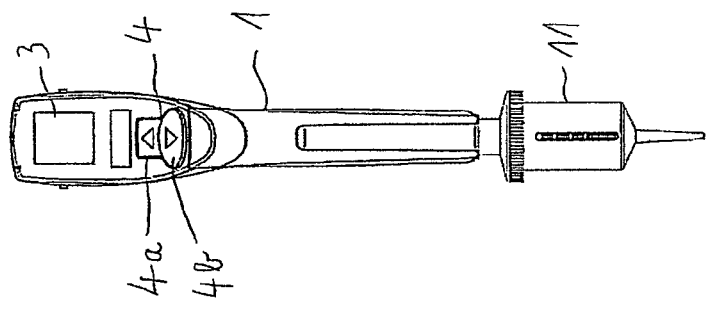

FIG. 1*a* shows a pipetting device 1 according to the invention, configured as a repeater pipette 1, in accordance with a preferred embodiment, with a dispenser tip 11 being connected thereto. The pipetting device has a user interface apparatus which has a display 3 which, in particular, serves to display the values of operating parameters of the pipetting device and, in particular, serves to describe the operating parameters. The user interface apparatus furthermore has an operating rocker 4 as a central operating element with an upper actuation area 4*a* and a lower actuation area 4*b*, with the user setting a first operating state (first operating area pressed) and a second operating state (second operating area pressed) by pressing said rocker. In particular, the first operating state starts the suctioning of a fluid sample from an initial container (not shown here) into the storage container of the dispenser tip 11 by means of a suctioning process which is set in accordance with predetermined operating parameters. In particular, these operating parameters relate to the sample volume to be suctioned and the receiving speed (volume per unit time) used in the process or—equivalent thereto in the case of a known container geometry—the time interval used for suctioning. The container geometry or the container type can be read out automatically by the pipetting device by means of a preferably provided reader apparatus, in particular by way of encoding in the transport container. The direct displacement principle is used when moving the sample by means of the dispenser syringe 11, as described at the outset.

The plunger (not shown here) of the dispenser tip 11 has an outwardly exposed connection lug 11a, which is connectable to a movable part 12 of the pipetting device—and detachable therefrom again—as shown in FIG. 1c. The second operating state in particular starts a dispensing process, in which the sample contained in the transport container 11 is dispensed in accordance with predetermined operating parameters. In particular, these operating parameters set the number of dispensing steps, the dispensing volume of a dispensing step and the dispensing speed (volume per unit time) or a value proportional thereto, which should be observed during a dispensing step or a plurality of dispensing steps or every dispensing step. The receiving speed and the dispensing speed can be determined by the at least one first speed value which is set automatically by the electronic control apparatus 15 of the pipetting device depending on the measured value. This process is explained below in an exemplary manner. Individual features of the description can be used to define a preferred embodiment of the invention. The pipetting device 1 is, in particular, program-controlled, i.e. the various sets of operating parameters, which are respectively assigned to a pipetting program and hence to a specific operating mode, can be set in a program-controlled manner such that a user optionally selects the desired pipetting program and, if desired, sets at least one operating parameter in order to carry out the desired pipetting process.

The dispenser tip 11 has a storage container with a larger diameter d2 and it has an opening with a smaller diameter d1, d1<d2 (FIG. 1b). The small opening is responsible for the majority of the drag generated when pipetting using the dispenser tip 11. A pipetting speed that is too high can cause an additional air cushion between sample and plunger end and thus lead to incorrect metering, while a relatively slow pipetting speed would result in a long-duration pipetting process, which would reduce the productivity when using the pipetting device. Due to the preferred embodiment described below, the pipetting device 1 does not exhibit such disadvantages.

As shown in FIG. 1c, the pipetting device 1 for pipetting fluid laboratory samples has at least the following components: an electric control apparatus 15, by means of which a pipetting process is electrically controllable, a movable part 12, by means of the movement of which the fluid sample is pipettable, an electrically controllable motor apparatus 14, by means of which the movement of the movable part is driveable depending on at least one first speed value v1 defining the speed of the movable part, a measuring apparatus 16, by means of which at least one measured value which is influenced by the drag caused when pipetting the fluid sample is measurable, wherein the electric control apparatus is configured for the purposes of the at least one first speed value being fixable by the electric control apparatus, depending on at least one measured value.

In the present case, the measuring apparatus 16 is a component of the electronic closed-loop control apparatus of the motor apparatus 14—in this case a stepper motor 14—and can be considered to be a component of the electric control apparatus 15, to which the measuring apparatus 16 is signal-connected. With very small increments, the stepper motor rotates a rotor apparatus (not shown here) step-by-step, which rotor apparatus in turn moves a spindle (not shown here) step-by-step, the rotation of which spindle causes the step-by-step translational movement of the plunger along the direction A (FIG. 1c), said plunger thus brings about the receiving and dispensing of the sample into the transport container or from the latter.

Figure 1D:
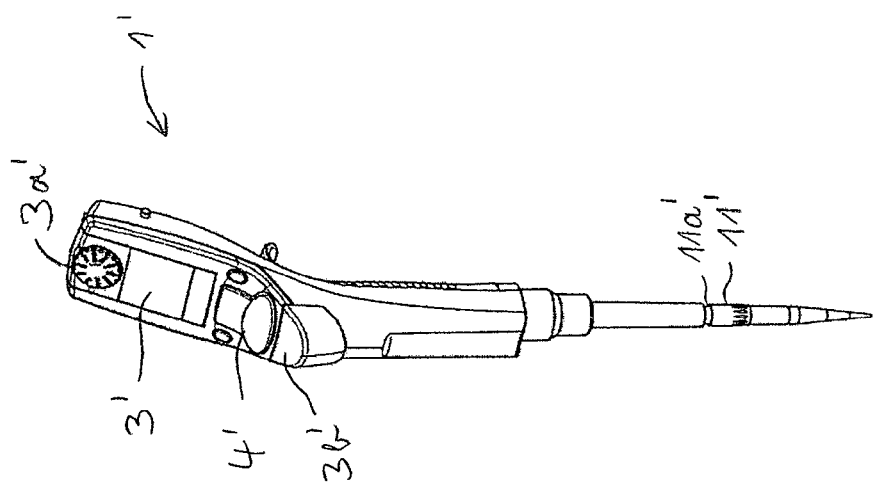

FIG. 1d shows a perspective side view of a pipetting device 1' according to the invention, which is configured as an electronic air-cushion pipette 1' and has a pipetting tip 11' connected to the connection cone 11a' thereof. The air-cushion pipette comprises an integrated plunger (not visible here), which can generate a vacuum in the interior of the pipette tip when the plunger is moved upwards. Thus, the sample to be pipetted is suctioned further into the pipette tip. Typical maximum capacities of such air-cushion pipettes lie from a few ten micrometre to 1 millimetre. The air-cushion pipette 1' has a user interface apparatus, in particular a selection wheel 3a', a display 3', and an operating rocker 4'. The pipette tip can be discarded by way of the discard button 3b'. The air-cushion pipette 1' furthermore comprises an electric control apparatus and a measuring apparatus (each of which are not visible here).

The electric control apparatus, in particular the control apparatus 15, is configured, in particular, to carry out the method according to the invention which, in particular, is shown in FIG. 2a in an exemplary manner:

The method 100 according to the invention for operating the pipetting device 1 in particular comprises—with reference to FIG. 2a—the following steps:
- (110) measuring at least one measured value by means of a measuring apparatus of the pipetting device during a pipetting process, wherein the at least one measured value is influenced by the drag caused when pipetting the fluid sample (a); step 110 can, in particular, comprise steps 111 and 112 described below;
- (120) setting at least one first speed value by means of an electric control apparatus of the pipetting device depending on the at least one measured value, wherein a speed value defines a speed of the movable part of the pipetting device, wherein the fluid sample is pipettable by the movement of the movable part (b); step 120 can, in particular, comprise steps 121 to 124 described below;
- (130) electrically actuating the electric motor apparatus of the pipetting device using the at least one first speed value set in step b) which defines the speed of the movable part, by means of which the motor apparatus drives the movement of the movable part (c); step 130 can, in particular comprise steps 131 and 132 described below.

In two different, preferred embodiments of the method according to the invention, which is operated with a pipetting device in accordance with a preferred embodiment, the method has features which are described on the basis of FIGS. 2a to 5:

A receiving and/or dispensing speed is preferably predetermined by the user by way of a menu displayable on the display 3 of the pipetting device 1; this is the value described within the scope of the description of the invention as "at least one second speed value". The speed values are respectively scale values of an instrument-specific scale in this case.

The software calculates a speed profile which, inter alia, automatically set the at least one first speed value.

Figure 4:
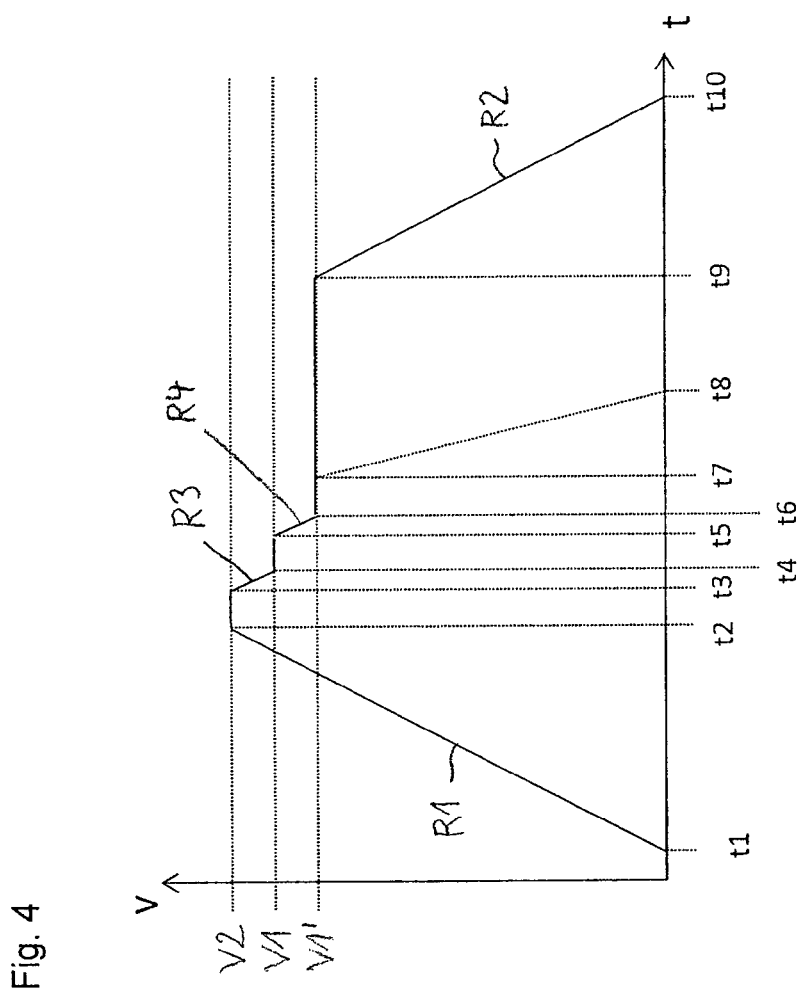
FIG. 4 shows a time profile during a pipetting process, which is performable in a method according to the invention or with a pipetting device according to the invention in a preferred embodiment.

FIGS. 2*b* and 4 show an example of the method in which the first speed value is automatically reduced depending on the measured value. Measured values can be measured within a predetermined time interval—in this case t6-t2—because, in the case of a motor current that is too high, the protection circuit of the rechargeable battery would become effective after 20 ms at the time t7 in the case of an overload (emergency shutdown). The time interval t6-t2 can, in particular, be 15 ms.

Step 111: after starting the pipetting process at the time t1 (FIG. 4), the speed v of the movement of the plunger increases over a gradient R1 until, at the step 112, the maximum value (second speed value v2) selected by the customer is reached at the time t2.

The speed remains constant at the value v2 between the first time t2 and the third time t3 (FIG. 4), wherein t3 emerges in particular from t3=t2+dt2, where dt2 is a preselected first time interval of preferably <15 ms.

At the end of the pipetting (partial) process (e.g. receiving liquid), the speed falls back to the value 0 by way of a gradient R2 (FIG. 4).

When the motor 14 starts up, the speed v increases by way of the gradient R1 to the maximum value v2. During this time, the software-controlled control electronics do not intervene (FIG. 4).

As shown in FIG. 4, the motor current of the electric motor is measured at the time t3 as (first) measured value M after reaching the maximum value at the time t2 (121). The current is compared to the reference value, a maximum value (122). In the example of FIG. 4, the maximum value for the motor current lies exactly at the value v1' for the first speed.

If the measured value M measured for the current lies below the maximum value, the pipetting process is carried out in accordance with the first, pre-calculated speed profile for the first speed (FIG. 2*b*, 130*a*).

If the comparison operation 121 in step 122 shows the measured value lying in a predetermined, inadmissible range, the following can be automatically carried out by the control apparatus: step 124: the first speed value is automatically established anew and used as setpoint value for the closed-loop control of the plunger speed. Thus, as is the case in FIG. 4, if the measured value M measured for the current lies above the maximum value, the pipetting process is continued in accordance with a new speed profile for the first speed (FIG. 2*b*, 124), which is calculated at the time t3, preferably within a time interval <1 ms and preferably less than or equal to 300 μs. Here, a first speed value v1 is selected automatically by the control apparatus, said speed value lying below the second speed value v2 selected by the user. By way of example, the value v1 can be half, a quarter, a tenth or, in general, a fraction of the second speed value selected by the user and/or it can be set in a predetermined manner by the control electronics, in particular taking into account the first measured value. After reducing the first speed value to the first speed value v1 and after constant operation of the motor between t4 and t5, another measurement can be carried out at the time t5, as is the case in FIG. 4, in order to further regulate the speed value depending on the measured value, namely to regulate it down to v1', or the pipetting process can be continued with the automatically set first speed value (130*a*') if the comparison operation 122' shows that the measured value lies in a predetermined, admissible range. A further measurement can take place at the time t7. In the example of FIG. 4, the latter shows that the measured value for the motor current now lies in the admissible range, and so there is no emergency shutdown and the motor can continue to be operated in accordance with the speed profile calculated at time t5, before it is stopped at the gradient R2, which stops the advance of the plunger and hence the pipetting.

FIG. 2*b*, step 131: the plunger speed is regulated to the new setpoint value, in particular by negative acceleration of the movable part along the gradient R3 between the times t3 and t4. Here, the new setpoint value is transmitted to the PD controller of the closed-loop control apparatus of the control apparatus 15, which regulates the motor voltage of the motor 14. The actual values are recorded by way of a counter of the control apparatus and forwarded to the controlled system of the closed-loop control apparatus of the control apparatus. The incremental encoder of the control apparatus converts the rotations of the motor 14 into the travelled distance of the movable part 12 (spindle, rod, etc.). The travelled distance is decisive for the sample volume to be received and dispensed. The values of the incremental encoder are included in the controlled system.

Figure 3:
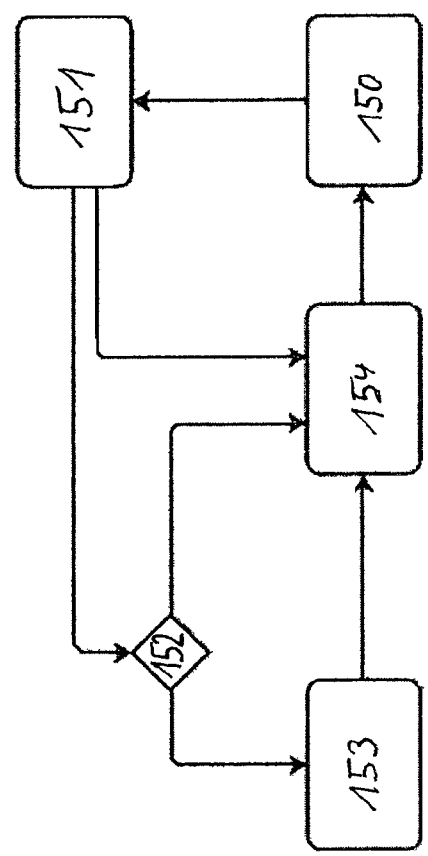
FIG. 3 shows a block diagram for the electronic closed-loop control of the first speed value depending on the measured value, which is usable in the method according to the invention and in a pipetting device according to the invention.

A preferred embodiment of the closed-loop control is shown schematically in FIG. 3. FIG. 3 shows a block diagram for the electronic closed-loop control of the first speed value depending on the measured value, which is usable in the method according to the invention and in a pipetting device according to the invention, in particular in the method in FIG. 2*b*. Here, the closed-loop control is a component of the electric control apparatus and suitable to adapt the first speed value to a drag of the pipetted sample determined by the viscosity of the sample. At least one characteristic measured value of the motor apparatus 150 is recorded during the operation of the pipetting device (151). Such a measured value can preferably be the motor current, i.e. the current uptake of the motor, or a voltage, in particular the motor voltage, which the motor draws from the power supply thereof, or a torque, or values which derive from the rotational speed, such as e.g. the travelled distance of a coupled threaded rod. These values are transmitted to the PD controller 154 and are compared to at least one or more, instrument-specific maximum admissible reference values (152). In particular, a reference value for the "motor current" measured value is a value, set in advance, for this electric current. When at least one reference value, or all reference values, is/are exceeded in the positive (or alternatively in the negative) direction, the motor can, in particular, be stopped by transmitting a signal to the controller (emergency shutdown) if the reference value is characteristic for the motor being overloaded. When at least one other reference value or other reference values is/are exceeded in the positive (or alternatively in the negative) direction, the motor can be braked by virtue of the first speed value being reduced by a predetermined magnitude. If the measured values or the at least one measured value lies under the reference value, a recalculation (153) of the speed profile is undertaken within the maximum admissible boundaries predetermined by the user.

The time for calculating at least one first speed value, or a speed profile of this first speed value, is generally preferably less than 1 ms and preferably less than or equal to 300 μs. This is advantageous in that pipetting with a non-ideal first speed value only takes place within such a very short period of time before the speed value is adapted and the pipetting process proceeds in an ideal manner.

When calculating the speed profile, the distance of the movable part, in particular of the plunger of the pipetting device or the plunger of a dispenser tip, already travelled is preferably taken into account and included in the calculation. The values in accordance with the speed profile are transmitted to the controller (154).

Step 132: the pipetting (partial) process is continued using the established setpoint value between the time t4 and the time t5. A measured value is measured again at the time t5, wherein t5 emerges in particular from t5=t4+dt3, where dt3 is a preselected first time interval of preferably less than 15 ms, and method steps 122, 130*a*, 124, 131 and 132 are carried out again as steps 122', 130*a*', 124', 131' and 132' in an analogous manner at a lower first speed value.

A new speed profile for the remaining time or for the remaining distance to be covered by the plunger is also calculated at the time t5. In accordance with this profile, the speed drops at the gradient R4 until the time t6. The speed v2 remains constant at the value v2 between the time t6 and the time t9 (FIG. 4).

The time t5 or t6 is calculated from the desired sample volume to be pipetted and the values of the speed or the gradient R2 (corresponding to a slowing down, i.e. negative acceleration); the speed drops via a gradient R2 back to the value 0 at the end of the pipetting (partial) process (e.g. liquid reception).

What is achieved thus is that the pipetting device 1 can be operated reliably without there being metering errors caused by a pipetting speed that is too high.

Figure 5:
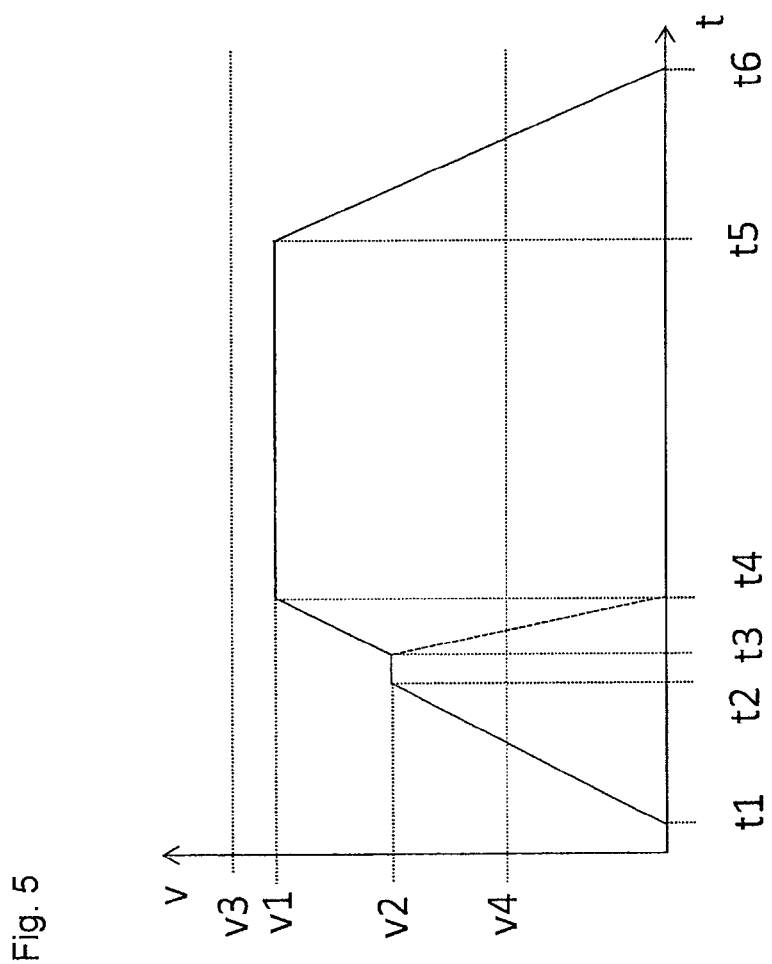
FIG. 5 shows a time profile during a pipetting process, which is performable in a method according to the invention or with a pipetting device according to the invention in another preferred embodiment.

FIGS. 2*c* and 5 show an example of the method in which the first speed value is automatically increased depending on the measured value.

Step 211: after starting the pipetting process at the time t1 (FIG. 5), the speed v of the movement of the plunger increases by way of a gradient R1 until the second speed value v2 selected by the customer is reached at the time t2 in step 212.

The speed remains constant at the value v2 between the first time t2 and the third time t3 (FIG. 5), wherein t3 emerges from, in particular, t3=t2+dt2, where dt2 is a preselected first time interval of preferably <15 ms.

At the end of the pipetting (partial) process (e.g. liquid reception), the speed falls back to the value 0 by way of a gradient R2 (FIG. 5).

When the motor 14 starts up, the speed v increases via the gradient R1 to the maximum value v2. During this time, the software-controlled control electronics do not intervene (FIG. 5).

After reaching the maximum value at the time t1, the motor current of the stepper motor is measured as (first) measured value M between the time t2 and t3 (221). The current is compared to the maximum value (222).

If the measured value M measured for the current lies above the maximum value, the action is aborted (230*a*)—the motor stops. The decision is made within dt2=15 ms because, in the case of a motor current that is too high, the protection circuit of the rechargeable battery would become effective after 20 ms in the case of an overload (emergency shutdown). Alternatively, a first speed value which lies below the second speed value selected by the user is automatically selected by the control apparatus. By way of example, the value can be half or a fraction of the second speed value selected by the user and/or can be set by the control electronics in a predetermined manner, in particular taking into account the first measured value. Another measurement could be carried out after reducing the speed value to the first speed value in order to further regulate the speed value, namely to regulate it up or regulate it down, or the pipetting process can be continued with the automatically set first speed value if the comparison operation 121 shows that the measured value lies in a predetermined, admissible range.

If the comparison operation 221 in step 222 shows that the measured value lies in a predetermined, admissible range, the following can automatically be carried out by the control apparatus:

Step 224: the first speed value is established automatically and used as setpoint value for the closed-loop control of the plunger speed. If the measured value lies under the maximum value, an optimized speed profile is calculated for the rest of the path of the movable part 12—the plunger. The at least one first speed v1 of this speed profile in this case lies within the limits v3 and v4 (FIG. 5), which were preferably predetermined as a tolerance region by the user for the application, i.e. for the operating mode.

Step 231: the plunger speed is regulated to the new setpoint value, in particular by accelerating the movable part along the gradient R3 between the times t3 and t4. Here, the new setpoint value is transferred to the PD controller of the closed-loop control apparatus of the control apparatus 15, which regulates the motor voltage of the DC motor 14. The actual values are recorded by way of the counter of the control apparatus and forwarded to the controlled system of the closed-loop control apparatus of the control apparatus. The incremental encoder of the control apparatus converts the rotations of the motor 14 into the path covered by the movable part 12 (spindle, rod, etc.). The path is decisive for the sample volume to be received and to be dispensed. The values of the incremental encoder enter the controlled system.

As already described above, the procedure in the examples in FIG. 4 and FIG. 5 can also be combined, in order, for example, firstly to be able to automatically reduce the speed for reasons of safety (in accordance with FIG. 4) and/or increase it automatically in order to reduce the overall pipetting time (FIG. 5). The combination is also advantageous for being able to react flexibly to changes in the viscosity in the sample to be pipetted, which may be decisive, particularly in the case of heterogeneous samples.

The invention claimed is:

1. A pipetting device, for pipetting fluid laboratory samples, comprising:
    an electric control apparatus, by means of which a pipetting process is electrically controllable,
    a movable part, by means of the movement of which the fluid sample is pipettable,
    an electrically controllable motor apparatus, by means of which the movement of the movable part is driveable depending on at least one first speed value defining the speed of the movable part, and
    a measuring apparatus, by means of which at least one measured value which is influenced by the drag caused when pipetting the fluid sample is measurable,
    a user interface apparatus for allowing a user to select at least one second speed value, wherein the control apparatus is configured to use at least one second speed value selected by the user or predetermined by the pipetting device in order to set the at least one first speed value depending on the at least one second speed value, and
    wherein the electric control apparatus is configured for the purposes of the at least one first speed value being fixable by the electric control apparatus, depending on the at least one measured value.

2. The pipetting device according to claim 1, wherein the electric control apparatus is configured to evaluate the at least one measured value automatically and to modify the at least one first speed value automatically, depending on the result of this evaluation.

3. The pipetting device according to claim 1, wherein the electric control apparatus is configured for the purposes of the at least one first speed value being reduced by the electric control apparatus, depending on at least one measured value.

4. The pipetting device according to claim 1, wherein a pipetting process is characterized by at least one movement distance of the movable part and the control apparatus is configured to fix the at least one first speed value depending on the movement distance such that a pipetting process is carried out, in particular, with the movement distance set by the user.

5. The pipetting device according to claim 1, wherein a closed-loop control of the electric control apparatus is configured for the purposes of the at least one first speed value being set automatically depending on the at least one measured value in such a way that there is no departure of the at least one measured value from a predetermined tolerance range for the at least one measured value.

6. The pipetting device according to claim 1, wherein a pipetting process is characterized by at least one energy consumption value of the pipetting device and the control apparatus is configured to set the first speed value depending on the at least one energy consumption value in such a way that a pipetting process is carried out, in particular, at a predetermined, in particular minimal, energy consumption value.

7. The pipetting device according to claim 1, further comprising a user interface apparatus, a clock and a storage apparatus, wherein the control apparatus has a computer apparatus and is configured to:
use at least one second speed value selected by a user by means of the user interface apparatus or predetermined by the pipetting device in order to carry out a pipetting process using the at least one second speed value during a first time interval,
determine at least one first measured value during the first time interval, and
carry out a comparison operation using the computer apparatus in order to compare the first measured value with a reference value stored in the storage apparatus.

8. The pipetting device according to claim 7, wherein the first measured value characterizes a first drag of the fluid laboratory sample moved during the first time interval and the reference value characterizes a maximum permissible drag of a fluid laboratory sample, wherein the control apparatus is configured, during a second time interval following the first time interval, to carry out the following:
if the first measured value is greater than the reference value:
carry out the pipetting process using at least one first speed value, which is less than the at least one second speed value, or—additionally or alternatively:
abort the pipetting process.

9. The pipetting device according to claim 1, wherein the measuring apparatus is configured to measure a motor parameter being the motor current of the motor apparatus, and wherein the measured value characterizes the motor parameter.

10. A method for operating a pipetting device according to claim 1, comprising:
a) measuring at least one measured value by means of the measuring apparatus of the pipetting device during a pipetting process, wherein the at least one measured value is influenced by the drag caused when pipetting the fluid sample;
b) setting at least one first speed value by means of an electric control apparatus of the pipetting device depending on the at least one measured value, wherein a speed value defines a speed of the movable part of the pipetting device, wherein the fluid sample is pipettable by the movement of the movable part; and
c) electrically controlling the electric motor apparatus of the pipetting device using the at least one first speed value set in step b) which defines the speed of the movable part, by means of which the motor apparatus drives the movement of the movable part.

* * * * *